United States Patent [19]
Jaulain et al.

[11] Patent Number: 5,940,179
[45] Date of Patent: Aug. 17, 1999

[54] TRIAXIAL LASER GYROMETER INCLUDING AN ACTUATING MECHANISM IN THERMAL CONTACT WITH THE CATHODE

[75] Inventors: Yves Jaulain, Scorbe Clairvaux; Etienne Bonnaudet, Haut Fontaine; Eric Loil, Chatellerault; Jacques Cordonnier, Colombiers; André Boura, Chatellerault, all of France

[73] Assignee: Sextant Avionique, Velizy Villacoublay, France

[21] Appl. No.: 09/010,935

[22] Filed: Jan. 22, 1998

[30] Foreign Application Priority Data

Feb. 5, 1997 [FR] France ................... 97 01270

[51] Int. Cl.$^6$ .................................................. G01C 19/70
[52] U.S. Cl. .......................................................... 356/350
[58] Field of Search ............................... 356/350; 372/94

[56] References Cited

U.S. PATENT DOCUMENTS 4,839,903  6/1989  Simms et al. ...................... 356/350
5,457,641  10/1995  Zimmer et al. .

FOREIGN PATENT DOCUMENTS 0 521 364 A2  1/1993  European Pat. Off. .
2 730 561     8/1996  France .
2 137 013     9/1984  United Kingdom .

Primary Examiner—Samuel A. Turner
Attorney, Agent, or Firm—Oblon, Spivak, McClelland, Maier & Neustadt, P.C.

[57] ABSTRACT

In the disclosed laser gyrometer, the three resonant optical cavities of the block are connected to a cathode chamber by means of the three cathode capillary tubes and to a balancing chamber by means of three balancing capillary tubes. The axis of the cathode is identified with the axis of actuation. The block is actuated by means of an actuating ring in thermal contact with the cathode so as to provide for dissipation of the heat generated at the cathode. The invention makes it possible to solve the problems relating to wobble (or lack of dynamic balance) as well as thermal gradients.

10 Claims, 6 Drawing Sheets

TRIAXIAL LASER GYROMETER INCLUDING AN ACTUATING MECHANISM IN THERMAL CONTACT WITH THE CATHODE

An object of the present invention is a device for fastening the optical unit of a triaxial laser gyrometer to an actuating device.

It relates more particularly to a monobloc optical laser gyrometer comprising an optical unit, for example made of quartz or Zerodur comprising three intercommunicating resonant optical cavities (one per detection axis), for example of the type described in the French patent FR No. 80 06298 filed on Mar. 21, 1980 on behalf of the Société Francaise d'Equipements pour la Navigation Aérienne (S.F.E.N.A.), this patent having been transferred to Sextant Avionique.

In this example, these three cavities together form a regular octahedron having eight triangular faces. Each of these cavities has a square shape and extends in all three orthogonal planes (respectively perpendicular to the three axes of measurement). They are arranged so that each of the corners of a cavity coincides and communicates with the corner of another cavity. A mirror associated with each coinciding pair is oriented so as to be used by both cavities forming said pair. In each cavity, one of the mirrors called a reading mirror is associated with a mixer prism that enables the generation of a phenomenon of interference enabling the detection of the motions of the gyrometer and hence of the vehicle that bears it. Another mirror, called a servo-controlled mirror, is mounted on a transducer support so as to servo-link the length of the cavity in order to obtain maximum output power. Each of the cavities encloses gas under low pressure and is provided with at least one cathode and two anodes that are appropriately placed so as to prompt an excitation of the electrons of the gas atoms and produce, within the cavity, two counter-propagating beams of radiation that are propagated in reverse to each other along the optical path.

To compensate for the difference in frequency between the two counter-propagating waves, two symmetrical discharges are generated in the cavity by means of a cathode. The cathode housing of this cathode communicates by means of two cathode capillary tubes with two opposite regions of the cavity where it is desired to obtain the two discharges.

In fact, in a triaxial gyrometer of the above type, only one cathode is used connecting the three cavities by means of three capillary tubes.

This cathode is fitted into a cathode chamber whose axis $\Delta$ is perpendicular to a cathode face of said octahedron demarcated by three capillary segments respectively belonging to the three cavities. This chamber is connected to all three cavities at the corners of the cathode face by three cathode capillary tubes positioned symmetrically with respect to the axis $\Delta$ in a third-order symmetry.

Furthermore, the gyrometer has an actuating mechanism that enables the generation of an alternating rotational motion of the unit along an axis of actuation.

It turns out to be the case that, in a gyrometer of this type, the cathode is a source of concentrated heat on one and the same side of the optical unit and therefore generates a thermal gradient in the unit disturbing the gas flows.

Furthermore, to reduce the conical motions of the unit which are likely to disturb the result of the measurement, it proves to be necessary to design the block so that the center of gravity and the center of inertia are in the axis of actuation.

The invention is therefore more particularly aimed at increasing the performance characteristics of the laser gyrometer defined here above by resolving the problems of wobble (or lack of dynamic balance) as well as thermal gradient while at the same time considerably simplifying the assembly of the block on the actuating mechanism.

SUMMARY OF THE INVENTION

To achieve this result, there is proposed a gyrometer wherein the axis of the cathode is identified with the axis of actuation and the actuating mechanism includes an actuating wheel whose actuating ring is in thermal contact with the cathode so as to provide for dissipation of the heat generated in the cathode.

In a first embodiment, the actuating wheel can take a polar position. In this case, it could be positioned around the cathode in thermal contact with it. In this case, the rotational driving of the optical unit could be obtained by means of shims that are fixedly joined to the actuating ring and are bonded to chamfered ridges of the optical unit bordering one face of the unit comprising the cathode.

Advantageously, this actuating mechanism could furthermore include a balancing wheel that makes use of a balancing ring fixedly joined to the unit by means of shims that get fixed by bonding to a chamfered ridge bordering a triangular face opposite the cathode face and parallel to it.

In a second embodiment, the actuating ring could take up an equatorial position and could be fixed to the unit by means of two series of shims that get applied to the faces of the unit on either side of the equatorial plane. In this case, the actuating rings could be fixedly joined to a coaxial heat collector ring that is positioned around the cathode and in thermal contact with this cathode. A coaxial balancing ring could be furthermore positioned opposite the collector ring.

BRIEF DESCRIPTION OF THE DRAWINGS

Modes of execution of the invention are described hereinafter by way of non-restrictive examples with reference to the appended drawings, of which.

MORE DETAILED DESCRIPTION

In these examples, the gyrometer includes an optical unit 1 with an octahedral shape having chamfered ridges within which there are made, in three orthogonal planes, three cavities B, C, D comprising capillary segments $B_1$ to $B_4$–$C_1$ to $C_4$–$D_1$ to $D_4$ each demarcating an optical path with a square shape.

These cavities B, C, D are arranged so that each of the corners of a cavity coincides and communicates with the corner of another cavity. They therefore define a regular octahedron, in the interior space of the unit, having eight triangular faces parallel to the faces of the unit and six peaks at which there are placed six respective mirrors $M_1$, $M_2$, $M_3$, $M_4$, $M_5$, $M_6$ which extend respectively in the planes of the faces of a cube in which the octahedron is contained. In this example, the mirrors $M_1$, $M_2$, $M_3$ are reading mirrors while the mirrors $M_4$, $M_5$, $M_6$ are associated with piezoelectric transducers to provide for the servo-control of the cavities.

To generate the pairs of counter propagating beams within the three cavities B, C, D, the gyrometer has a cathode K and six anodes A.

The cathode K is fitted into a cathode chamber CK whose axis $\Delta$ is perpendicular to the cathode face $F_1$ of the octahedron demarcated by the capillary segments $B_3$, $C_3$, $D_3$ going through the center of this face $F_1$. This chamber CK which is outside the octahedral volume defined by the cavities B, C, D, communicates with these cavities at the three translatable mirrors $M_4$, $M_5$, $M_6$ which define the face $F_1$, by means of three respective capillary tubes $CK_1$, $CK_2$, $CK_3$. These three capillary tubes are positioned symmetrically in a third-order symmetry with respect to the axis $\Delta$.

These three capillary tubes $CK_1$, $CK_2$, $CK_3$ (or cathode outlets) are used for the ionization of the active capillary tubes between the cathode K and the anode A.

In this example, the cathode K includes an external cylindrical part that is coaxial with the axis $\Delta$ and fixed to the unit on a triangular face parallel to the face $F_1$.

Figure 1:
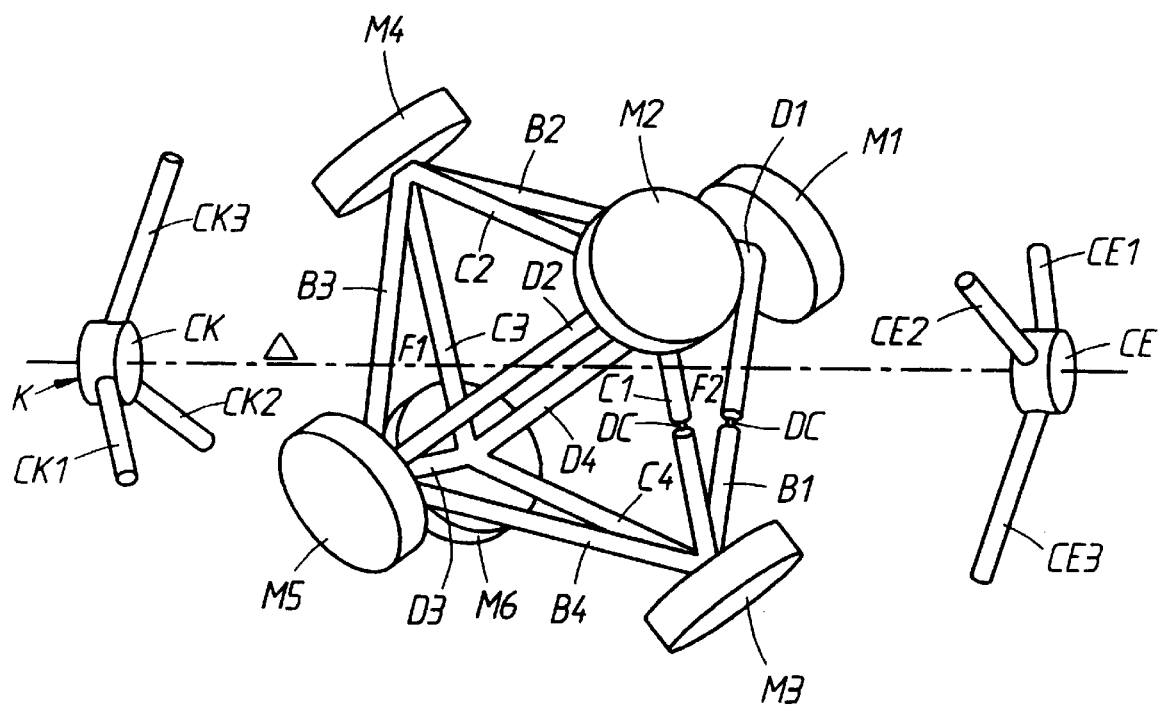
FIG. 1 is a drawing in perspective of the optical cavities of an optical unit of a laser gyrometer according to the invention.
Figure 2:
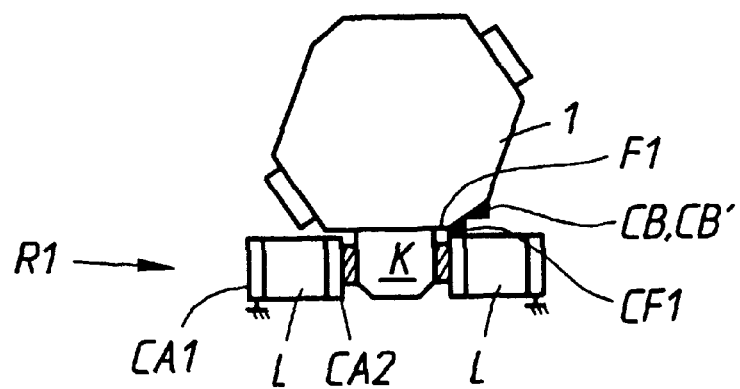
FIG. 2 is a schematic drawing illustrating the principle of the polar mounting of an actuating wheel around the cathode of the unit.

The six anodes A, of which only two are shown in FIG. 2, are positioned so that in each cavity there is obtained a pair of discharge zones that are "active zones" symmetrical with respect to an axis of symmetry distinct from the axis of symmetry $\Delta$. Each pair of anodes A extends in the plane of the corresponding cavity B, C, D.

The thermal and thermodynamic balancing is obtained here by means of a cylindrical balancing chamber CE substantially identical to that of the cathode chamber CK positioned coaxially, in relation to this cathode chamber CK, outside the octahedral volume before the face $F_2$ opposite the face $F_1$ (these two faces are perpendicular to the axis $\Delta$). This face $F_2$ is demarcated by three capillary segments $B_1$, $C_1$, $D_1$ each having, in their central region, a diaphragm DC. These three diaphragms DC are positioned symmetrically according to a third-order symmetry with respect to the axis $\Delta$.

The balancing chamber CE communicates with the cavities B, C, D at the three mirrors $M_1$, $M_2$, $M_3$ which define the face $F_2$ by means of three balancing capillary tubes $CE_1$, $CE_2$, $CE_3$ positioned symmetrically according to a third-order symmetry at 120° with respect to one another.

To maintain the symmetry of the flows, the three capillary tubes $CE_1$, $CE_2$, $CE_3$ can be positioned in one and the same plane perpendicular to the axis $\Delta$. This is also the case for the three capillary tubes $CK_1$, $CK_2$, $CK_3$.

Through these arrangements, the balancing chamber CE achieves a balance of the pressures on the anode A side of each of the six active zones. Since the assembly includes the cathode chamber CK and its three capillary tubes $CK_1$, $CK_2$, $CK_3$ which are associated with it, this assembly for its part equalizes the pressures of the six active zones on the cathode K side.

Consequently, the six active zones are subjected to one and the same difference in pressure and give rise to the same flows even when these flows are disturbed by thermal gradients which are minimized for the reasons described here above.

As mentioned here above, the gyrometer according to the invention has an actuating mechanism whose axis of actuation is identified with the axis $\Delta$ so that all three cavities of the optical unit rotate at the same speed.

A mechanism of this kind can be made according to one of the three variants of execution illustrated in the drawings, namely: a mechanism with one polar wheel (FIG. 2), a mechanism with two polar wheels (FIGS. 3 and 4) and a mechanism with one equatorial wheel (FIGS. 5 to 8).

In the example shown in FIG. 2, the actuating mechanism comprises first of all an actuating wheel $R_1$ comprising two coaxial rings $CA_1$, $CA_2$ connected to each other by a plurality of radial fins L. These fins L comprise a driving and detection element connected to an amplifier so as to prompt a motion of alternating rotation of one of the rings $CA_2$ with respect to the other ring $CA_1$.

The fastening of the optical unit 1 to the central ring $CA_2$ (the actuating ring) of the actuating mechanism is done by means of a fastening ring $CF_1$, having substantially the same diameter as the actuating ring $CA_2$, on which it can be assembled coaxially by screwing.

This fastening ring $CF_1$ which is designed to be positioned coaxially with the cathode K has three pairs of bevelled shims (only one of which can be seen) located at 120° with respect to one another and designed to get bonded respectively to the central regions of the chamfered ridges surrounding the face $F_1$ of the unit.

The link between the cylindrical internal surface of the ring $CA_2$ and the external cylindrical surface of the cathode K can be obtained by direct contact or with the interposing of a material that is a good conductor of heat.

Indeed, the aim of this link is to provide thermal dissipation of the heat generated in the cathode K by transferring it into the bearing structure of the gyrometer which then fulfils the role of a heat sink by means of the actuating wheel $R_1$. This thermal transfer proves to be particularly efficient owing to the high qualities of thermal conductibility of the structure of the actuating mechanism which is a monobloc structure and therefore does not contain any discontinuity in the thermal transfer. Furthermore, the presence of numerous fins L enables the actuating mechanism itself to play the role of a heat sink on which it is possible to obtain the circulation of a flow of cooling liquid. It must be specified that in this example, the function of the link between the cathode K and the ring $CA_2$ is limited to thermal transfer and is not a function of ensuring the transmission, to the optical unit 1, of the rotational motion generated by the actuating mechanism. Indeed, in order to avoid strains liable to cause the cathode K to get detached, this link may advantageously comprise a sliding link (by the interposition of a gel and a lubricant that is a good conductor of heat). It could furthermore comprise an electrically insulating ring so as to prevent any risk of electrical conduction between the cathode K which is taken to high voltage and the metal structure of the sensor.

In fact, the transmission of the torque between the ring $CA_2$ and the unit 1 is done essentially by bevelled shims CB, CB' that exert a pressure applied the chamfered facets of the unit 1 bordering the triangular face $F_1$ without generating any shear strains liable to cause the shims to get separated.

The pairs of shims CB, CB' also play a role of thermal transfer and regulation. Indeed, they herein provide for a dissipation of the heat generated in the unit at the cathode chamber and the cathode capillary tubes.

Through these arrangements, there is obtained an excellent balancing of the unit 1, and therefore a corresponding reduction of the conical motion, and at the same time, a cooling with symmetrization and thermal homogenization of the unit 1.

Figure 3:
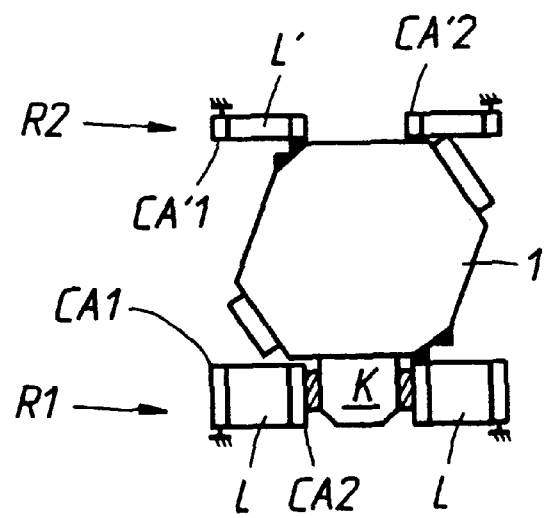
FIG. 3 is a similar drawing of a mounting that makes use of a polar actuating wheel and a balancing wheel.
Figure 5:
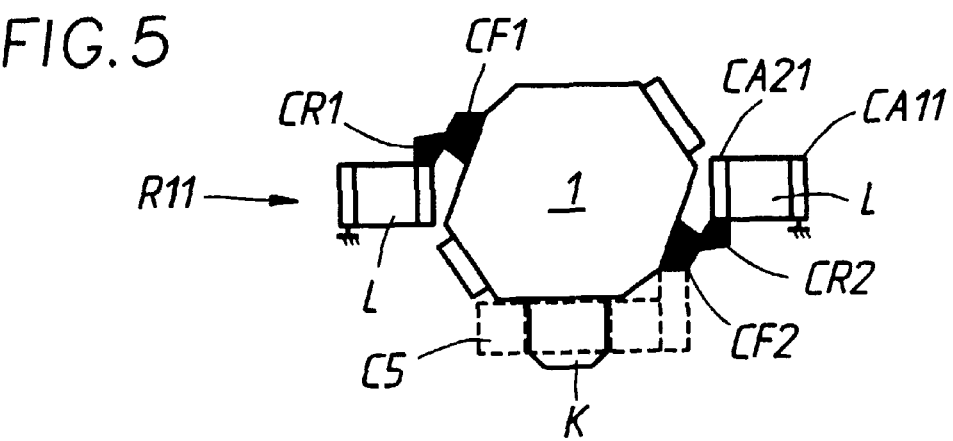
FIG. 5 is a schematic view illustrating the principle of the equatorial mounting of an optical unit on an actuating wheel.
Figure 4:
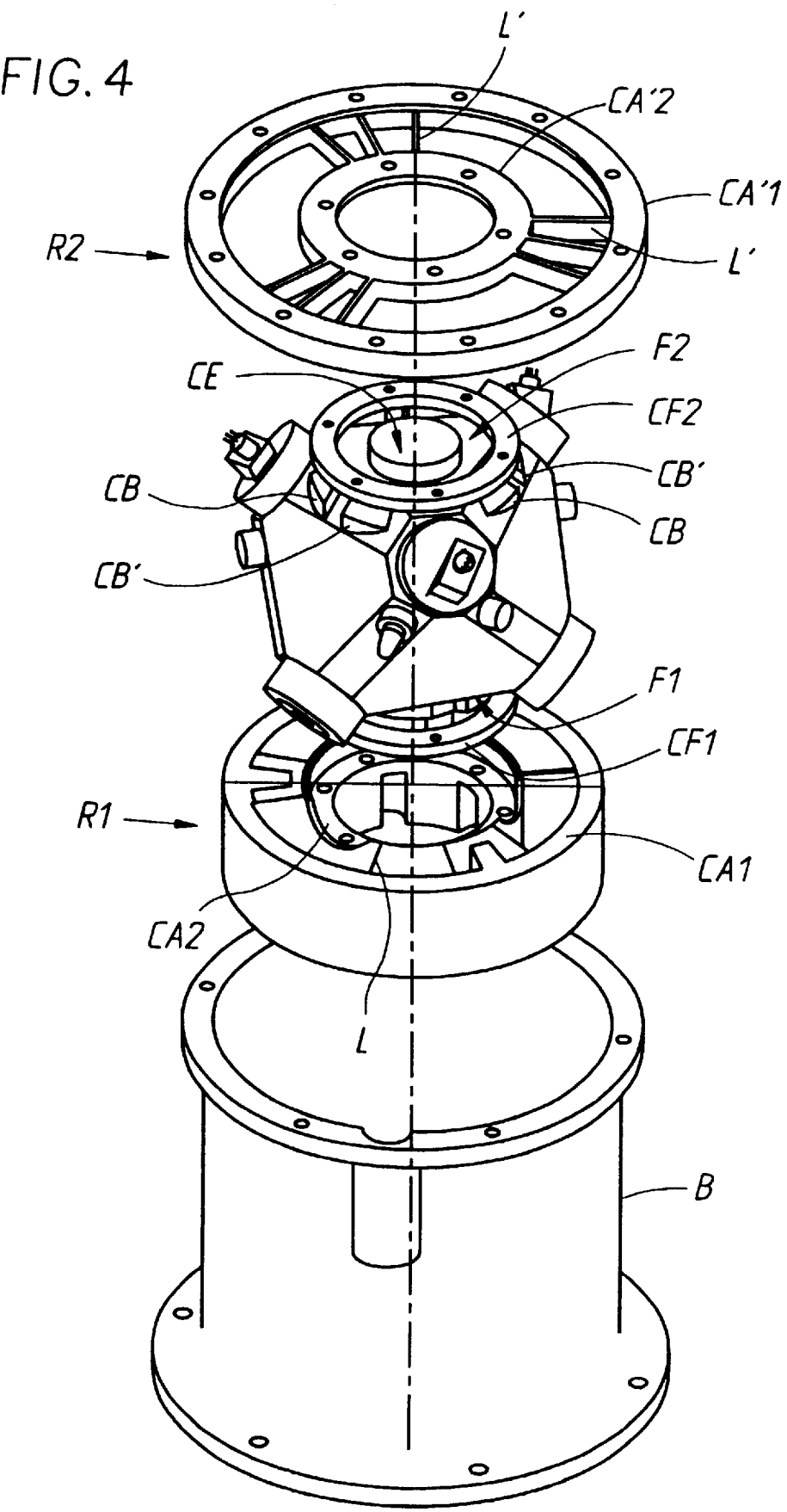
FIG. 4 is an exploded view in perspective of a mounting of the type shown in FIG. 3 mounted in a gyrometer casing.
Figure 6:
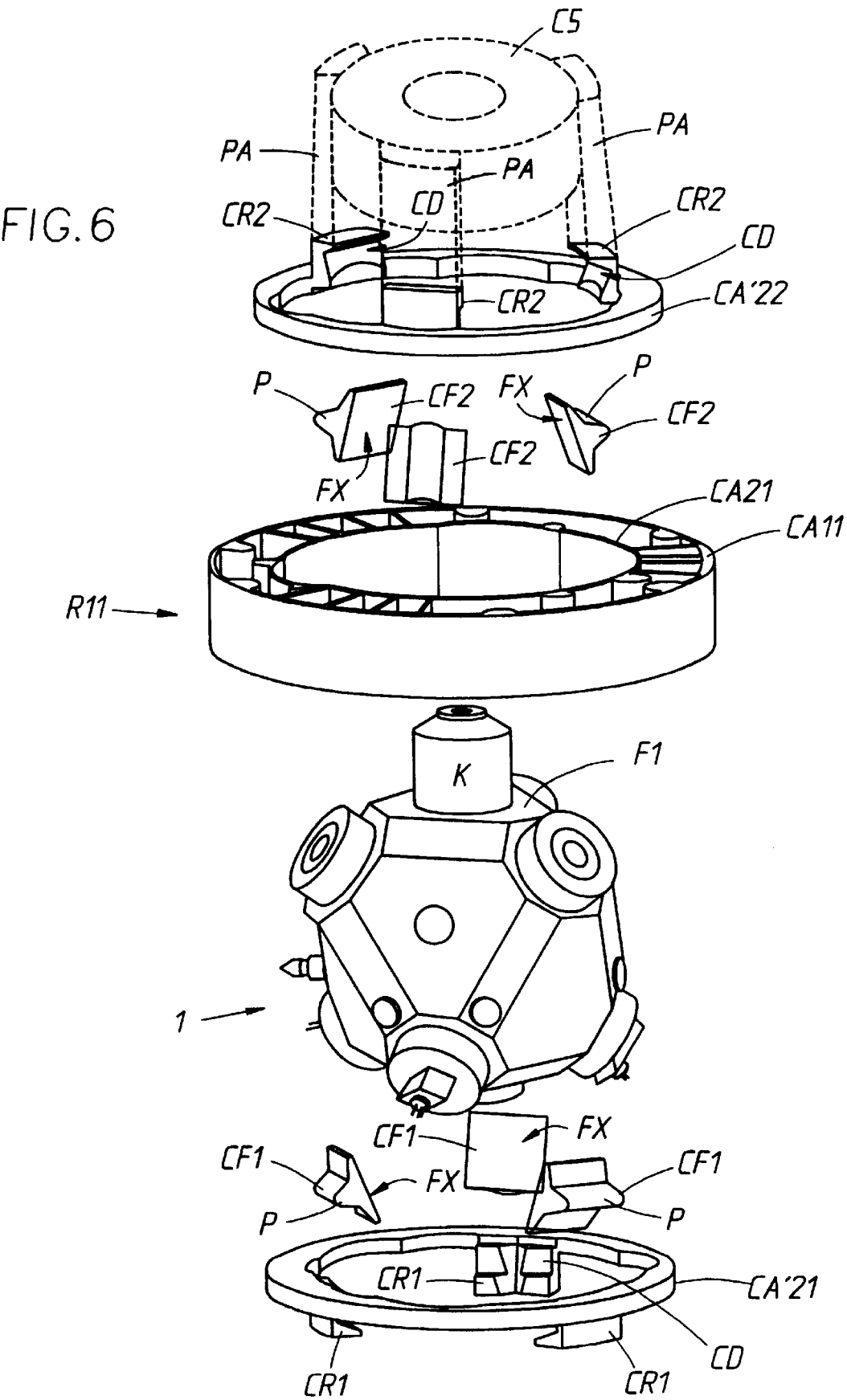
FIG. 6 is an exploded view in perspective of the different parts of the equatorial mounting shown in FIG. 5.
Figure 7:
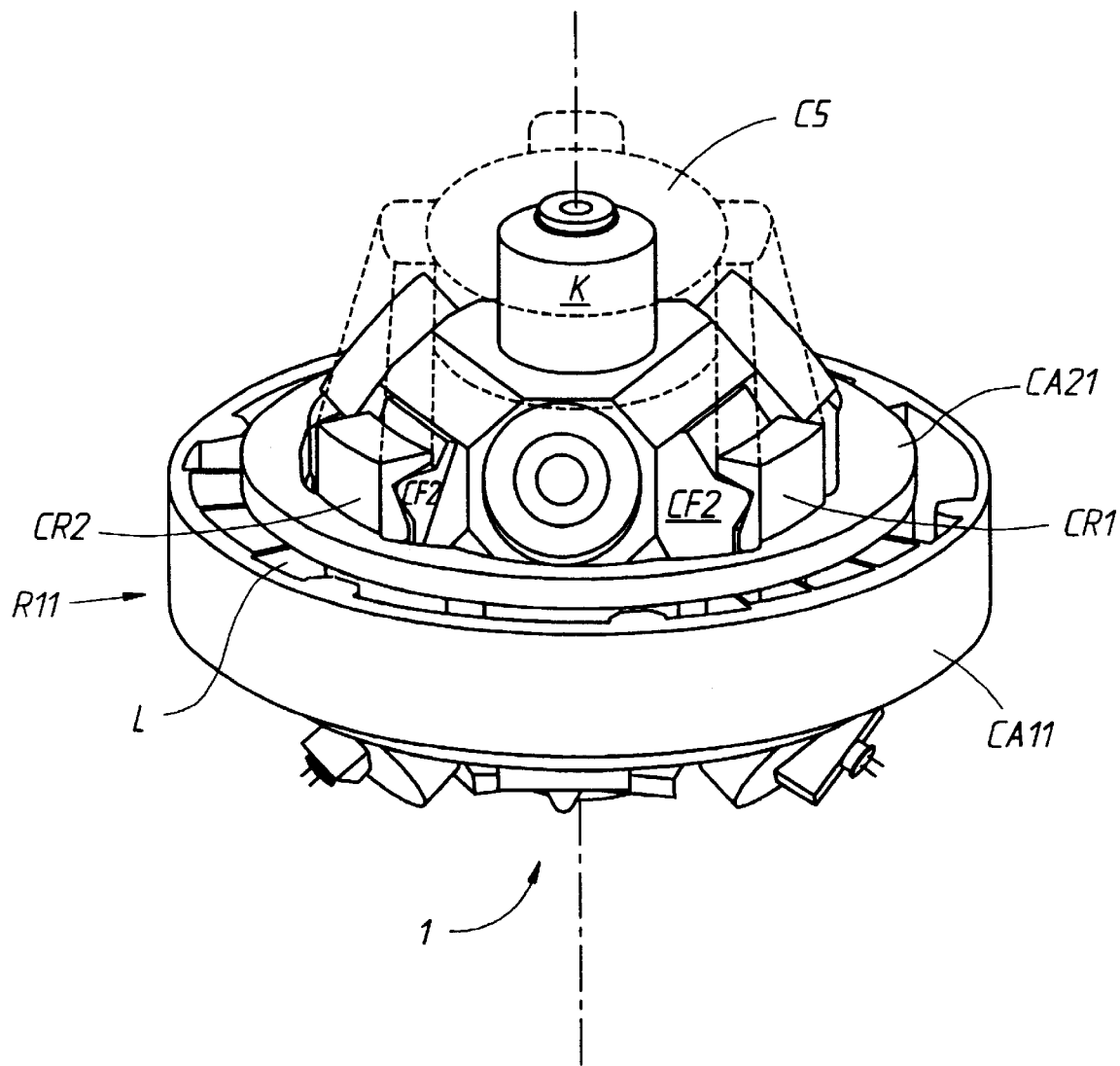
FIG. 7 is a view in perspective of the mounting in an assembled position.
Figure 8:
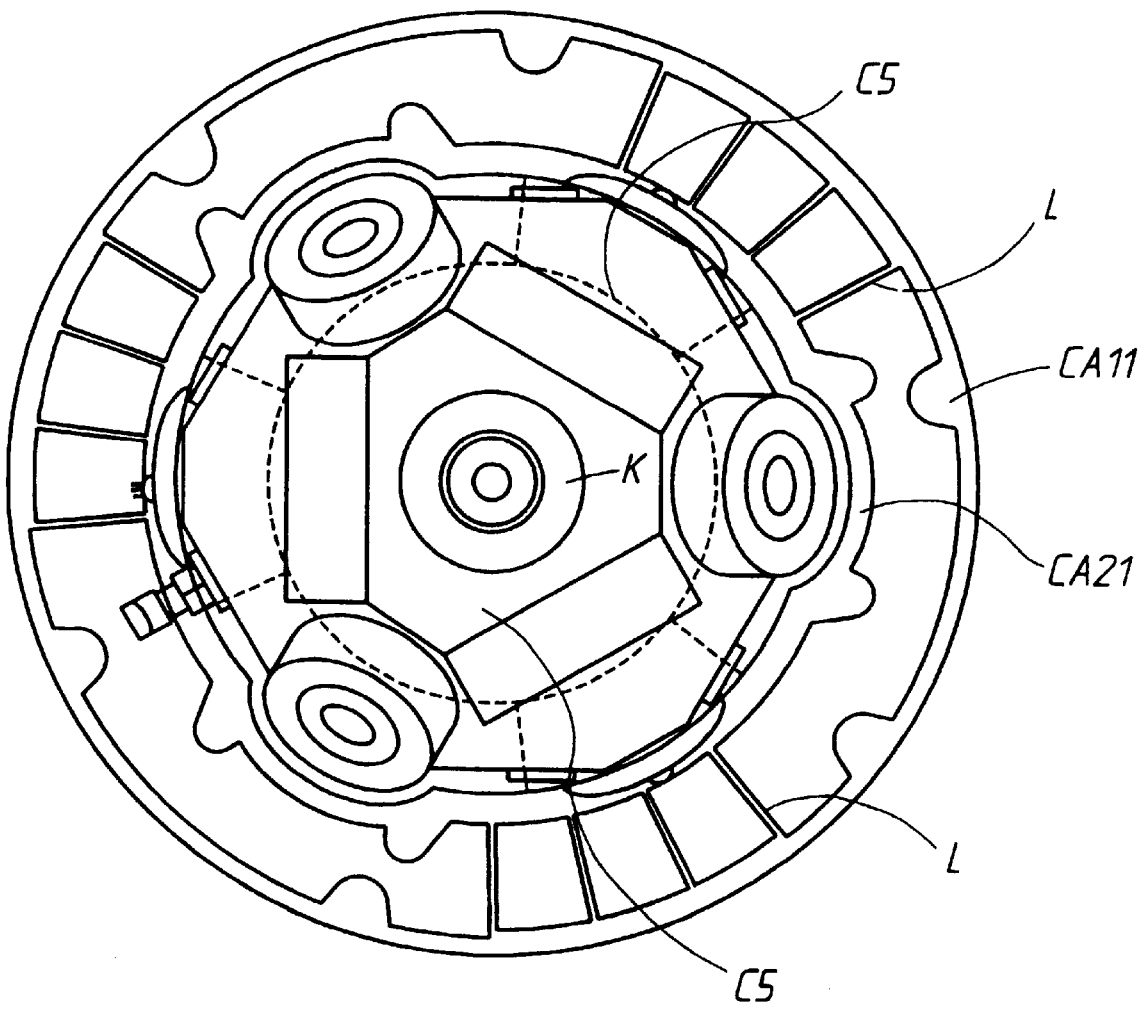
FIG. 8 is a top view of the mounting shown in FIG. 6.

The mounting with two polar wheels shown in FIGS. 3 and 4 uses firstly an activation wheel $R_1$ similar to that described in the variant of FIG. 2 and, secondly, the balancing wheel $R_2$.

In this example, the actuating mechanism comprises first of all an actuating wheel $R_1$ comprising two coaxial rings $CA_1$, $CA_2$ connected to each other by a plurality of radial fins L. These fins L comprise a piezoelectric driving and detection element connected to an amplifier so as to prompt a motion of alternating rotation of one of the rings $CA_2$ with respect to the other ring $CA_1$.

The fastening of the optical unit 1 to the central ring $CA_2$ (actuating ring) of the actuating mechanism is done by means of a fastening ring $CF_1$, substantially with the same diameter as the actuating ring $CA_2$ on which it can be assembled coaxially by screwing.

This fastening ring $CF_1$ which is designed to be positioned coaxially with the cathode K has three pairs of bevelled shims located at 120° with respect to one another and designed to get bonded respectively to the central regions of the chamfered ridges surrounding the face $F_1$ of the unit.

The balancing wheel $R_2$ comprises, for its part, two coaxial rings $CA'_1$, $CA'_2$ connected to each other by a plurality of flexible radial fins L'.

Similarly to the previous case, the fastening of the ring $CA'_2$ to the optical unit 1 (opposite its equatorial plane with respect to the actuating wheel $R_1$) is done by means of a fastening ring $CF_2$ substantially having the same diameter as the ring $CF_1$ and identical to the ring $CA'_2$ on which it can be assembled coaxially by means of screws.

This fastening ring $CF_2$ which is designed to be positioned coaxially to the balancing chamber CE, has three pairs of bevelled shims CB, CB' located at 120° with respect to one another and designed respectively to get bonded to the central regions of the chamfered ridges surrounding the face $F_2$.

The assembly comprising the optical unit 1 and the two wheels $R_1$, $R_2$ is housed in a gyrometer casing B whose internal cylindrical shape is substantially equal to the external diameter of the rings. Fastening means are planned to hold the rings $CA_1$, $CA'_1$ on the casing B by providing for the mechanical fixing of the two rings as well as a thermal link. Consequently, the casing B enables the dissipation of the heat generated in the optical unit 1 (this is its role of a heat sink) and the reduction of the thermal gradient between the cathode K and the balancing chamber CE by setting up a thermal short circuit.

A major advantage of this approach is that it enables excellent balancing of the optical unit 1 and a corresponding reduction of the conical motion.

In the example shown in FIGS. 5 to 8, the actuating mechanism makes use of an actuating wheel $R_{11}$ similar to the wheels $R_1$ described here above but wherein the actuating ring $CA_{21}$ has an internal diameter that is substantially equal to the diameter of the circle in which the section of the unit 1 is inscribed at its equatorial plane (perpendicular to the axis Δ).

The fastening of the actuating ring $CA_{21}$ to the unit 1 is then provided by means of two coaxial fastening rings $CA'_{21}$, $CA'_{22}$ that respectively get fixed, for example by means of screws, to the two opposite radial faces of the ring $CA_{21}$ and by means of securing shims $CF_1$, $CF_2$ held by hooks $CR_1$, $CR_2$ respectively fixed to the rings $CA'_{21}$, $CA'_{22}$ and extending axially in a projection with respect to the external radial faces of said rings $CA_{21}$ and $CA_{22}$.

In this example, each of the hooks $CR_1$, $CR_2$ has a substantially parallelepiped shape in which the internal face (oriented towards the axis Δ) has a dihedral cavity CD whose ridge extends in a plane perpendicular to the axis Δ.

The securing shims $CF_1$, $CF_2$ have a fastening face FX with a rectangular shape and a rear curved face having a protuberance P with an incurvated section that extends from one lateral edge of the shim to the other.

This protuberance P is designed to get housed in the dihedral cavity CD of a hook $CR_1$, $CR_2$ while enabling the shim $CF_1$, $CF_2$ to be oriented so as to get applied to one of the triangular faces of the optical unit 1.

In this example, each external face of the rings $CA_{22}$, $CA_{21}$ has three hooks $CR_2$, $CR_1$ at 120° with respect to one another associated with three shims $CF_2$, $CF_1$ that get applied to the three triangular faces adjacent to the cathode face $F_1$ or to the balancing face $F_2$.

A major advantage of this mode of fastening is that it enables a self-centering of the unit 1 on the actuating wheel $R_{11}$ in the assembly. Given the distribution of the shims $CF_1$, $CF_2$ on either side of the equatorial plane, there is obtained a fastening that is purely mechanical (by clamping) and detachable from the unit (which does not require any bonding).

The cooling of the cathode K is obtained here by means of a coaxial additional ring CS whose internal diameter is substantially equal to the external diameter of the cathode K. This ring CS is fixedly joined to the ring $CA'_{22}$ through the axial extensions PA of the hooks $CR_2$, the assembly formed by the ring CS and the axial extensions PA being indicated in dashes in FIGS. 6 and 7. Naturally, the ring CS has to be made out of a material that is a good conductor of heat but is an electrical insulator given that the cathode K is taken to a high voltage.

It turns out to be the case that the structures described here above have numerous advantages with respect to their construction, their integration into a casing, their resistance to harsh mechanical environments (in terms of symmetry, limitation of the forces transmitted to the unit, limitation of conical motions due to balancing defects, absorption of expansion forces) as well as with respect to problems relating to the working of the gyrometer (thermal homogeneity, improvement of thermal dissipation of the cathode, minimizing of thermal gradients and homogenizing of flows within capillary tubes).

Furthermore, they are well suited to being integrated within a casing.

What is claimed is:

1. A triaxial gyrometer laser of the type comprising an optical unit comprising three communicating resonant optical cavities that form a regular octahedron having eight triangular faces, each of the cavities having four capillary segments forming a square that is perpendicular to a corresponding axis of measurement, these cavities being arranged so that each of the corners of a cavity coincides and communicates with the corner of another cavity, a mirror associated with each pair of coinciding corners being oriented so as to be used by both cavities forming said pair, each cavity using four mirrors including one reading mirror and one mirror to servo-control the cavity length, this cavity being connected to a cathode chamber by means of two cathode capillary tubes leading to two successive mirrors and to a balancing chamber by means of two balancing capillary tubes leading to the other two mirrors, said gyrometer further comprising an actuating mechanism enabling the block to be driven in an alternating motion of rotation about an axis of actuation, wherein the axis of the cathode is identified with the axis of actuation and wherein the actuating mechanism includes an activation wheel whose actuating ring is in thermal contact with the cathode so as to provide for a dissipation of the heat generated at the cathode.

2. A gyrometer according to claim 1, wherein said actuating wheel takes a polar position and is positioned about the cathode, in thermal contact with it.

3. A gyrometer according to claim 2, wherein the rotational driving of the optical unit is provided by means of shims that are fixedly joined to the actuating ring and get attached to the chamfered ridges of the optical unit bordering the cathode face of the unit.

4. A gyrometer according to claim 3, comprising three pairs of shims positioned at 120° with respect to one another and designed to get bonded to the central regions of the chamfered ridges surrounding said face.

5. A gyrometer according claim 1, wherein the actuating mechanism furthermore comprises a balancing wheel that makes use of a balancing ring fixedly joined to the unit by means of shims that get fixed by bonding to a chamfered ridge bordering a triangular face opposite the cathode face and parallel to it.

6. A gyrometer according to claim 5, wherein the balancing ring is fixedly joined to the unit by means of three pairs of shims positioned at 120° with respect to one another and designed to get bonded respectively to the central part of the chamfered ridges surrounding the triangular face.

7. A gyrometer according to claim 1, wherein the actuating ring occupies an equatorial position and is fixed to the block by means of two series of shims that get applied to the faces of the block on either side of the equatorial plane.

8. A gyrometer according to claim 7, wherein the actuating ring is fixedly joined to a heat collector ring positioned around the cathode and in thermal contact with it.

9. A gyrometer according to claim 8, wherein the actuating ring is fixedly joined to a balancing ring positioned opposite to the collector ring.

10. A gyrometer according to claim 1, housed within a gyrometer casing in thermal contact with the actuating wheel so as to play the role of a heat sink.

* * * * *